United States Patent [19]
Collins, Jr.

[11] Patent Number: 5,398,415
[45] Date of Patent: Mar. 21, 1995

[54] CUTTER WITH GRIPPER

[76] Inventor: Moseley C. Collins, Jr., 110 Elwa Pl., West Palm Beach, Fla. 33405

[21] Appl. No.: 293,295

[22] Filed: Aug. 22, 1994

[51] Int. Cl.$^6$ ............................................. B26B 13/00
[52] U.S. Cl. ........................................ 30/124; 30/134
[58] Field of Search ........................ 30/124, 134, 135; 83/456, 460

[56] References Cited
U.S. PATENT DOCUMENTS

| | | | |
|---|---|---|---|
| 382,764 | 5/1888 | Hammond | 30/134 |
| 2,218,213 | 10/1940 | Newman | 30/134 |
| 2,337,285 | 12/1943 | Widdowson | 30/134 |
| 2,775,032 | 12/1956 | Sorenson | 30/134 |
| 3,520,058 | 7/1970 | Pfaffenbach | 30/134 |
| 3,777,398 | 12/1973 | Routh, Jr. | 30/124 |
| 4,185,379 | 1/1980 | Amstutz | 30/134 |
| 4,464,837 | 8/1984 | Amstutz | 30/134 |

FOREIGN PATENT DOCUMENTS

| | | |
|---|---|---|
| 602098 | 3/1926 | France . |
| 562095 | 3/1957 | Italy . |

Primary Examiner—Hwei Siu Payer
Attorney, Agent, or Firm—Alvin S. Blum

[57] ABSTRACT

Gripping cutters have either shearing blades or blade-and-anvil cutting members. Attached to one lateral side of each cutting member is a movable jaw arranged to grip the elements being cut when the cutter is closed and to release the elements when open. Each jaw has a pair of elongate parallel pins extending from its rear face. A pair of supports affixed to each lateral side have an aperture for slidably receiving a pin. A compression spring on the pin forces the jaws together and an adjustable stop on the pin limits the extent of the jaw movement so that the relative position of the blades at the moment of release of the cut elements may be adjusted. Resilient jaw faces may be provided for gripping small and large branches simultaneously.

8 Claims, 1 Drawing Sheet

CUTTER WITH GRIPPER

BACKGROUND OF THE INVENTION

This invention relates to cutting devices and more particularly to cutters having two operating elements which are moved together to bring cutting elements together to cut hedges, branches, wires and other elongate elements while holding onto the distal, cut-off portion of the elements as long as the operating elements are held together.

When trimming hedges, shrubs, small tree branches and the like, the cut material may fall to the ground or into the remaining vegetation where it would be unsightly if not removed. After trimming, a second chore of clearing away the cut material must therefor be performed. When the cut vegetation is thorny, the effort may be compounded. A cutting tool that would hold the cut material until released over a waste receptacle would resolve the clean up problem. Cutting tools for cutting wire, nails and the like pose another problem. So much force is required for cutting, that the elastic energy stored in the metal is suddenly released when the cut is completed. The cut off pieces may fly off with considerable force, presenting a danger to the user as well as compounding the clean up task. A cutter that would grip the material to be cut off before the cut is completed would overcome the problem.

SUMMARY OF THE INVENTION

It is accordingly an object of the invention to provide gripping cutters in which the cut off material is held until the user releases the material by moving the blades apart. The gripping clippers of the invention include a pair of blades arranged with a scissors or shearing action when moved together. Each blade is supplied with a pair of supports permanently attached to a common side. A movable elongate jaw is springably mounted in each pair of supports such that when the shears are closed the two jaws are forced together, compressing the springs against the supports. The movable jaws are provided with broad jaw faces which are in contact with one another when the shears are closed, unless one or more branches, twigs or the like intervene. When material comes between the jaw faces, it will be held firmly in place until the blades are opened. The jaw movement in the supports is substantially a translatory motion defined by guide pins which are attached to the jaws and slide in the supports. The jaw faces may be provided with a resilient material such as rubber so that multiple twigs of different diameters may be held simultaneously.

In another embodiment of the invention, the cutters may be of the blade and anvil type.

These and other objects, advantages and features of the invention will become more apparent when the detailed description is studied in conjunction with the drawings.

DETAILED DESCRIPTION OF PREFERRED EMBODIMENTS

Figure 1:
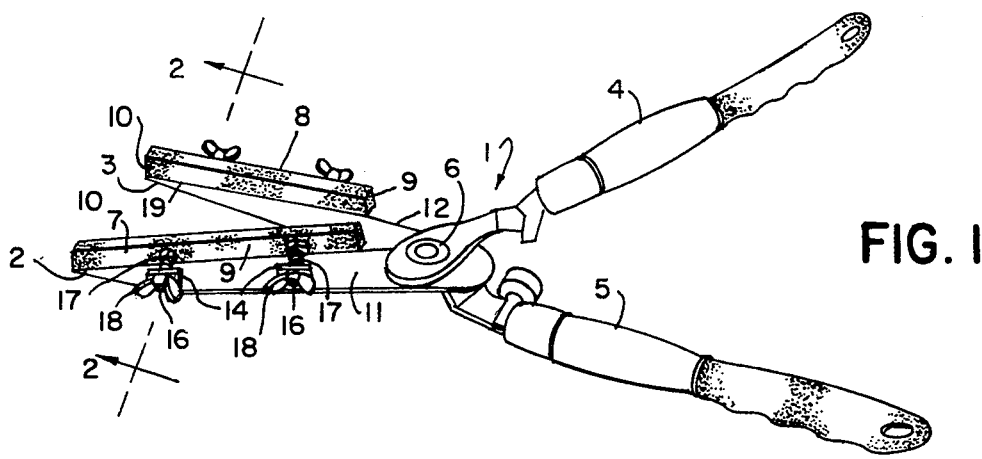
FIG. 1 is a perspective view of a hedge trimmer of the invention.
Figure 2:
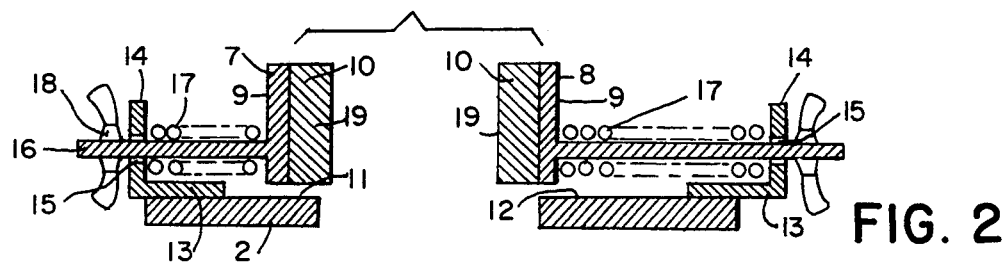
FIG. 2 is a sectional view taken through line 2—2 of FIG. 1.

Referring now first to FIGS. 1 and 2, a hedge trimmer 1 of the invention has blades or cutting members 2, 3 attached to operating elements or handles 4 and 5 respectively, and joined by pivot 6 for shearing action in a manner well known in the art. The improvement comprises the movable jaws 7, 8 which are spaced apart as shown when the shears are in the open position and which are springably forced together for gripping action when the handles are brought together to cut elongate elements such as the thin branches of a hedge or bush.

A pair of angle bracket supports 13 are welded or bolted to one lateral surface 11, 12 of each blade on a common side of the shears. An upstanding leg portion 14 of the support has an aperture 15. Each jaw is provided with a pair of elongate, spaced apart, parallel pins 16 extending from the rear face 9 of the jaw so as to be slidably received in the two apertures 15. A compression spring 17 is mounted on the pin so as to force the gripping faces 10 of the jaws toward each other. A wing nut 18 threadably engaged on pin 16 serves as a stop element to adjustably determine the limit of travel of the jaw and the spring tension. When the shears are closed to cut through branches, the gripping faces of the jaws are pressed together over the material being cut just prior to the actual cut. This holds the branch in cutting position so that there is reduced tendency for the branch to slip out of the blades during cutting. The branch or branches are gripped until the handles are moved apart an amount determined by the adjustable stops. This may be done after the cut material is held over a waste receptacle. This reduces the task of lifting cut branches from the bush, which is especially arduous with thorny plants. When the blades are long for cutting multiple branches at once, the branches with the largest diameters will force the closed jaws back against the springs to thereby determine the spacing between the jaws. Any branches with smaller diameters may not be held securely. The problem may be overcome by providing a resilient jaw surface 19 such as a foam polyurethane rubber which will indent more at the large diameter branch while still gripping smaller branches.

Figure 3:
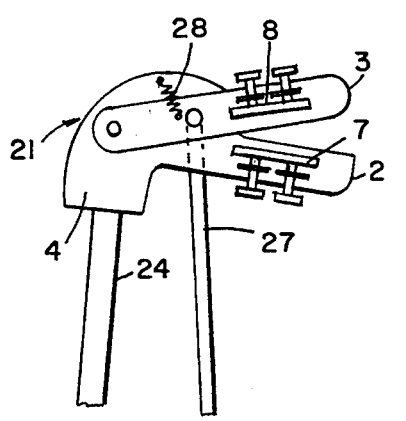
FIG. 3 is a side elevation view of a pole mounted cutter of the invention.

Referring now to FIG. 3, a pruning cutter 21 for use on an extension pole 24 uses a pull cord 27 for closing the blades and a return spring 28 to open them. Movable jaws 7, 8 will hold the cut branch until released.

Figure 5:
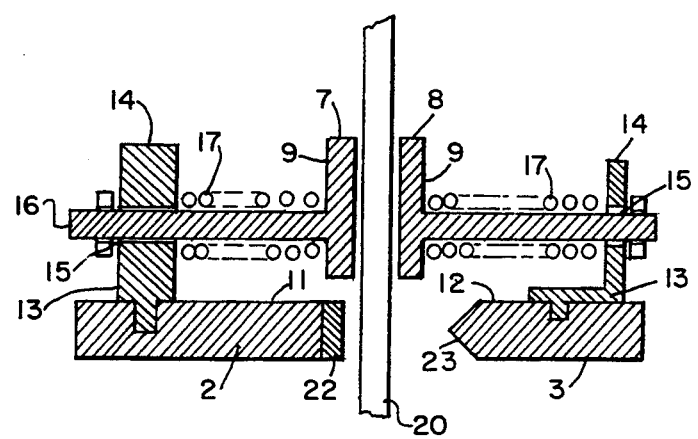
FIG. 5 is a sectional view taken on line 5—5 of FIG. 4.
Figure 4:
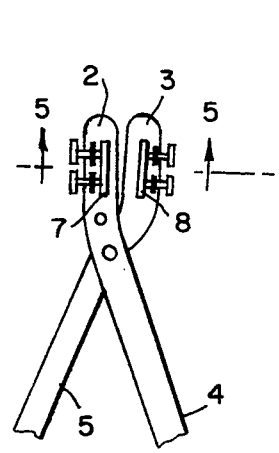
FIG. 4 is a side elevation view of another embodiment of the invention.

Referring now to FIGS. 4, 5 another embodiment of the invention shows a pruning cutter in which the cutting members 2, 3 do not move past each other in a shearing action. Instead the blade edges meet each other. One blade 3 has a sharp edge 23 of hard steel and the other blade 2 has a softer metal edge 22 to operate as, a blade and anvil cutter of the type well known in the art shown partially open just before releasing branch 20.

Figure 6:
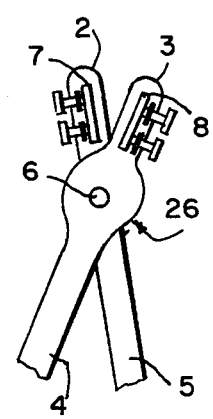
FIG. 6 is a side elevation view of a wire cutter of the invention.

A wire cutting pliers 26 of the invention for holding in one hand is shown in FIG. 6, this may employ either shearing blades or blade and anvil type of cutting actions as desired.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A gripping cutter for cutting and holding elongate elements, said cutter comprising:
   A) first and second cutting members movably connected together, each member having two opposed lateral surfaces;
   B) a first operating element operatively connected to said first member;
   C) a second operating element operatively connected to said second member;
   D) said operating elements arranged for moving said members toward one another for cutting and gripping in a closed position and for moving said members away from one another for releasing said elements in an open position;
   E) a pair of movable jaws, each jaw having a gripping face and a rear face;
   F) a pair of elongate parallel, spaced apart, pins attached to, and extending from, the rear face of each jaw;
   G) a pair of supports each attached to a respective lateral surface of each member such that said supports are on a common side of said cutter, each support having a leg upstanding from said lateral surface, with each leg having an aperture therethrough, with each aperture arranged to slidably receive one of said pins;
   H) spring bias means between each said jaw and each said support for forcing said jaws toward one another such that said gripping faces are springably pressed together when said cutting members are in said closed position for gripping cut elements; and
   I) a stop element mounted on each said pin for limiting axial movement of said pin relative to said leg for regulating the distance between said gripping faces when said cutter is in open position for releasing cut elements.

2. The cutter according to claim 1, in which said stop element is adjustable axially on said pin.

3. The cutter according to claim 2, in which each gripping face is provided with a resilient surface for grasping a plurality of elements of different diameters simultaneously.

4. The cutter according to claim 1, in which each gripping face is provided with a resilient surface for grasping a plurality of elements of different diameters simultaneously.

5. The gripping cutter according to claim 1, in which said cutting members are arranged for shearing action.

6. The gripping cutter according to claim 1, in which said first cutting member has a sharp edge and said second cutting member presents a flat edge for blade and anvil cutting action.

7. The gripping cutter according to claim 1, in which said first and second operating elements are arranged for grasping in one hand.

8. The gripping cutter according to claim 1, in which said first operating element is arranged to be held by one hand and said second operating element is arranged to be held by another hand.

* * * * *